United States Patent
Anatoly et al.

(10) Patent No.: US 6,387,338 B1
(45) Date of Patent: May 14, 2002

(54) PREPARATION OF MULTI-COMPONENT CE, ZR, MO$_X$ HIGH OXYGEN-ION-CONDUCT/OXYGEN-STORAGE-CAPACITY MATERIALS

(75) Inventors: Bortun I. Anatoly; John Gerard Nunan, both of Tulsa, OK (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/525,879

(22) Filed: Mar. 15, 2000

(51) Int. Cl.$^7$ ................ B01D 53/54; B01D 54/60
(52) U.S. Cl. ............... 423/239.1; 502/302; 502/304; 502/340; 502/349; 502/355
(58) Field of Search .......... 423/239.1; 502/302, 502/304, 340, 349, 355; 501/102, 103, 126, 152

(56) References Cited

U.S. PATENT DOCUMENTS

| | | | |
|---|---|---|---|
| 3,640,887 A | * 2/1972 | Anderson et al. | 501/102 |
| 4,193,857 A | * 3/1980 | Bannister et al. | 204/195 |
| 4,266,979 A | * 5/1981 | Miyoshi et al. | 106/57 |
| 4,985,210 A | 1/1991 | Minami | 422/169 |
| 5,051,244 A | 9/1991 | Dunne et al. | 423/212 |
| 5,057,483 A | 10/1991 | Wan | 502/304 |
| 5,168,085 A | 12/1992 | Addiego et al. | 502/66 |
| 5,525,559 A | * 6/1996 | Metcalfe et al. | 501/103 |
| 5,597,771 A | 1/1997 | Hu et al. | 502/304 |
| 5,616,223 A | * 4/1997 | Shen et al. | 204/295 |
| 5,662,869 A | 9/1997 | Abe et al. | 422/171 |
| 5,897,846 A | 4/1999 | Kharas et al. | 423/213.2 |
| 5,898,014 A | 4/1999 | Wu et al. | 502/302 |

OTHER PUBLICATIONS

"Effect of high temperature lean aging on the performance of Pt,RH/CeO$_2$ and rare earth/alkaline earth doped Pt,RH/CeO$_2$," J.G. Nunan et. al, Catalysis Today, 14 (1992) p. 277–291.

(List continued on next page.)

Primary Examiner—Steven P. Griffin
Assistant Examiner—Maribel Medina
(74) Attorney, Agent, or Firm—Vincent A. Cichosz

(57) ABSTRACT

The present invention relates to high oxygen ion conducting/oxygen storage capacity (OIC/OS) materials, a catalyst employing the OIC/OS materials, and a method for converting nitrogen oxides using the catalyst. The OIC/OS materials have stable cubic crystalline structures under oxidizing conditions (in air) up to about 1200° C. and in reducing conditions (5% hydrogen) up to about 1000° C. for 24 hours. These materials comprise up to about 95 mole percent (mole %) zirconium, up to about 50 mole % cerium and up to about 10 mole % yttrium, and optionally up to about 15 mole % of Y plus another rare earth or alkaline earth metal.

23 Claims, 16 Drawing Sheets

OTHER PUBLICATIONS

"Effect of copreciptation conditions on the surface area, phase composition, and reducibility of $CeO_2$–$ZrO_2$–$Y_2O_3$ materials for automotive three–way catalysts", O.A. Kirichenki, et. al., 1998 Elservier Science B.V., p. 411–420.

"Electrical properties of the $ZrO_2$–$CeO_2$ system", G. Chiodelli et al., Solid State Ionics 91 (1996) p. 109–121.

"Effect of dopant size on the ionic conductivity of cubic stabilised $ZrO_2$", R.J. Strafford et. al., Solid State Ionics 37 (1989) p. 67–68.

"Zirconia–based solid electrolytes: microstructure, stability and ionic conductivity", S.P.S. Baldwal, Solid State Ionics 52 (1992) p. 23–32.

"Structural changes of $ZrO_2$–$CeO_2$ solid solutions around the monoclinic–tetragonal phase boundary", Masatomo Yashima et al., Physical Review B, vol. 51, No. 13, p. 8018–8019 (1995).

Lanthanide–Containing Zirconotitanate Solid Solutions, Shara S. Shoup et. al., Journal of Solid State Chemistry 127 (1996); Article No. 0379 (2 pages).

Solid Solubility and Trasport Properties of Nanocrystalline $(CeO_2)_{1-x}(BiO_{1.5})_x$ by Hydrothermal Conditions, Guang-she Li et al., Chemical Mater. 1999, 11 (2 pages).

"Electrical properties and microstructure in the system ceria–alkaline earth oxide", Hidenori Yahiro et. al., Journal of Materials Science 23 (1988) 1 page.

"Water and hydrogen evolution properties and protonic conducting behaviors of $Ca^{2+}$–doped $La_2 Zr_2 O_7$ with a pyrochlore structure" Takahisa Omata et. al., Solid State Ionics 104 (1997) p. 249–250.

Electrical conductivity of the systems, $(Y_{1-x} M_x)_3$ Nb $O_7$ (M=Ca, Mg) and $Y_3 Nb_{1-x} M_x O_7$ (M' =Zr and Ce), Hiroshi Yamamura et. al. Solid State Ionics 123 (1999), p. 279–280.

Oxygen Ion Conductivity of Plantinum–Impregnated Stabilized Zirconia in Bulk and Microporous Materials, Andreas Ziehfreund et. al., Advanced Materials 1996, 8, No. 5, p. 424–427.

"Two methods of obtaining sol–gel $Nb_2O_5$ thin films for electrochromic devices", C.O. Avellaneda et. al., Journal of Materials Science 33 (1998), p. 2181–2185.

"Ionic Conductivity of Calcia, Yttria, and Rare Earth–Doped Cerium Dioxide" R.T. Dirstine et. al. pp. 264–269 (1979).

"Transport in Doped Fluorite Oxides" C.R.A. Catlow, Solid State Ionics 12 (1984) p. 67–73.

"The utilization of ceria in industrial catalysis", Alessandro Trovarelli et. al. Catalysis Today 50 (1999) p. 353–367.

* cited by examiner

PREPARATION OF MULTI-COMPONENT CE, ZR, $MO_X$ HIGH OXYGEN-ION-CONDUCT/OXYGEN-STORAGE-CAPACITY MATERIALS

TECHNICAL FIELD

The present invention relates to an OIC/OS material, and especially relates to an OIC/OS material having a stable cubic crystal structure.

BACKGROUND OF THE INVENTION

Solid electrolytes based on zirconia ($ZrO_2$), thoria ($ThO_2$) and ceria ($CeO_2$) doped with lower valent ions have been extensively studied. The introduction of lower valent ions, such as rare earths (Y, La, Nd, Dy, etc.) and alkaline earths (Sr, Ca and Mg), results in the formation of oxygen vacancies in order to preserve electrical neutrality and this in turn gives rise to oxygen ionic conductivity at high temperature (e.g. greater than 800° C.). Typical commercial or potential applications for these solid electrolytes includes their use in solid oxide fuel cells (SOFC) for energy conversion, electrochemical oxygen sensors, oxygen ion pumps, structural ceramics of high toughness, heating elements, electrochemical reactors, steam electrolysis cells, electrochromic materials, magnetohydrodynamic (MHD) generators, hydrogen sensors, catalysts for methanol decomposition, potential hosts for immobilizing nuclear waste and oxygen storage materials in three-way-conversion (TWC) catalysts.

Stabilized $ZrO_2$ has been studied as the most popular solid electrolyte. In the case of doped $ZrO_2$ both partially and fully stabilized $ZrO_2$ have been used in electrolyte applications. Partially stabilized $ZrO_2$ consists of tetragonal and cubic phases while the fully stabilized form exists in the cubic fluorite structure. Both $CeO_2$ and $ThO_2$ solid electrolytes exist in the cubic crystal structure in both doped and undoped forms. The amount of dopant required to filly stabilize the cubic structure for $ZrO_2$ varies with dopant type. For Ca it is in the range of 12–13 mole %, for $Y_2O_3$ and $Sc_2O_3$ it is greater than 18 mole % Y or Sc and for other rare earths ($Yb_2O_3$, $Dy_2O_3$, $Gd_2O_3$, $Nd_2O_3$ and $Sm_2O_3$) in the range of 16–24 mole % of Yb, Dy, Gd, Nd, and Sm.

Fully or partially stabilized $ZrO_2$, as well as other commonly studied solid electrolytes, have a number of drawbacks. In order to achieve sufficiently high conductivity and to minimize electrode polarization the operating temperatures have to be very high, in excess of 800–1,000° C. For solid oxide fuel cells for example, reducing the operating temperatures below 800° C. would result in numerous advantages such as greater flexibility in electrode selection, reduced maintenance costs, reduction in the heat insulating parts needed to maintain the higher temperatures and reductions in carbonaceous deposits (soot) that foul the operation of the fuel cell.

Further, in the automotive industry there is great interest in developing lower temperature and faster response oxygen sensors to control the air to fuel ratio (A/F) in the automotive exhaust. In the case of three-way-conversion (TWC) catalysts solid solutions containing both $ZrO_2$ and $CeO_2$ are used as oxygen storage (OS) materials and are found to be more effective that pure $CeO_2$ both for higher OS capacity and in having faster response characteristics to A/F transients.

Oxygen storage capacities (OSC) in these applications arises due to the facile nature of $Ce^{4+} \leftrightharpoons Ce^{3+}$ oxidation-reduction in typical exhaust gas mixtures. The reduction of the $CeO_2$ to $Ce_2O_3$ provides extra oxygen for the oxidation of hydrocarbons (HCs) and CO under fuel rich conditions when not enough oxygen is available in the exhaust gas for complete conversion to carbon dioxide ($CO_2$) and water ($H_2O$). The use of binary $CeO_2/ZrO_2$ and ternary $CeO_2/ZrO_2/M_2O_3$ based catalysts in such applications have advantages over the use of pure $CeO_2$ containing catalysts. This arises because in pure $CeO_2$ only surface $Ce^{4+}$ ions can be reduced in the exhaust at typical catalyst operating temperatures of 300–600° C. (See FIG. 1). However, in binary $CeO_2/ZrO_2$ or ternary $CeO_2/ZrO_2/M_xO_y$ solid solutions more oxygen is made available through the reduction of bulk $Ce^{4+}$ and the subsequent migration of 'O' to the surface of the solid solution crystallites where it reacts with the HCs and CO as is demonstrated in FIG. 2.

The 'O' migration to the surface of the solid solution crystallites is made possible by the formation of the solid solution and is thus an analogous process to that occurring when these same materials are used as solid solution electrolytes. Thus, a more accurate description of these materials for TWC catalyst applications is to view them as oxygen ion conducting/oxygen storage (OIC/OS) materials. These materials have a much higher oxygen storage capacity compared to pure $CeO_2$, especially after catalyst aging and the formation of large crystallites. Further, the response of these solid solutions to changes in the exhaust gas enviromnent is more rapid compared to pure $CeO_2$ with the result that they operate more effectively in preventing CO/HC breakthrough during accelerations and they further provide oxygen at lower temperatures.

Aging of electrolytes is a phenomena usually associated with a decrease in the ionic conductivity at a constant temperature with time. The aging process is a function of composition, operating temperature, time and temperature cycling. The two main causes of aging are: a) ordering of the cation and anion sublattice and b) decomposition of the metastable phases. In single phase cubic systems the major cause of aging is formation and growth of microdomains and disproportionation at high temperatures into different phases. Aging of cubic Y stabilized $ZrO_2$ oxygen ion conducting electrolytes for example can occur through disproportionation into a Y-rich cubic phase and a Y-poor tetragonal phase. Thus, phase stability at high temperatures is an important property of solid solution electrolytes and maintaining phase stability in an optimized cubic or tetragonal phase after high temperature operation or cycling is a highly desirable property.

For TWC catalyst applications the newest OIC/OS materials consist of a range of $CeO_2/ZrO_2$ solid solutions with lower valent dopants added to increase the number of oxygen vacancies and to increase the thermal stability and oxygen ion conductivity of the solid solutions after sintering at high temperatures. Zr-rich compositions have the advantage in that the reduction energies for $Ce^{4+} \rightarrow Ce^{3+}$ decrease with increasing Zr content and that the activation energies for mobility of 'O' within the lattice decreases. This is demonstrated in FIGS. 3 and 4 (Balducci et al., J. Phys. Chem. B., Vol. 101, No 10, p.1750, 1997). However, the Zr-rich systems suffer from the disadvantage in that the OSC capacity is decreased due to the lower $CeO_2$ content. Thus, strategies to optimize the availability (OIC) of the OSC function go counter to those that maximize oxygen storage capacity (OSC).

A further disadvantage of the Zr-rich systems is that the stable crystal structure is tetragonal rather than the more desirable cubic structure. The crossover composition between cubic and tetragonal occurs in the range of 35–45 Mole % $ZrO_2$. Compositions having higher $ZrO_2$ content have the tetragonal crystal structure while compositions of lower Zr content are cubic. Further, composites that increase the facile nature of both the $CeO_2$ reduction and mobility of 'O' (OIC) within the solid solution lattice at a given and high Ce content are advantageous. This is true not only for oxygen storage (OSC) applications in TWC catalysts but also for preparing highly effective electrolytes in solid oxide fuel cells (SOFCs) where high conductivity at low temperatures is a major requirement.

What is needed in the art are OIC/OS materials having stable cubic crystal structures, and high oxygen storage and oxygen ion conductivity properties.

SUMMARY OF THE INVENTION

The present invention comprises an OIC/OS material, a catalyst comprising the OIC/OS material, and a method for converting nitrogen oxides using the catalyst. This OIC/OS material comprises: up to about 95 mole percent (mole %) zirconium; up to about 40 mole % cerium; and up to about 10 mole % yttrium. The invention further comprises the reaction product of up to about 95 mole percent (mole %) zirconium; up to about 40 mole % cerium; and up to about 10 mole % yttrium.

The catalyst comprises: an OIC/OS material having up to about 95 mole percent (mole %) zirconium, up to about 40 mole % cerium, and up to about 10 mole % yttrium; a noble metal catalyst; and a porous support wherein said zirconium, cerium, yttrium, noble metal and porous support are disposed on a substrate.

The method for converting nitrogen oxides in an exhaust stream, comprising: using a catalyst comprising an OIC/OS material having up to about 95 mole % zirconium, up to about 40 mole % cerium, and up to about 10 mole % yttrium, a noble metal catalyst, and a porous support, disposed on a substrate; exposing the exhaust stream to the catalyst; and converting nitrogen oxides in the exhaust stream to nitrogen.

The above described and other features of the present invention will be appreciated and understood by those skilled in the art from the following detailed description, drawings, and appended claims.

DESCRIPTION OF THE PREFERRED EMBODIMENT

The present invention relates to a thermally stable OIC/OS material having a stable cubic structure (i.e., after aging at 1200° C. in air or aging in 5% hydrogen up to 1000° C., for at least about 24 hours). This OIC/OS material comprises cerium (Ce), zirconium (Zr), yttrium (Y), and optionally an earth metal. Possible earth metals include rare earth metals, such as the lanthanides (lanthanum (La), praseodymium (Pr), neodymium (Nd), promethium (Pm), samarium (Sm), gadolinium (Gd), terbium (Tb), as well as the other lanthanides); alkaline earth metals (barium (Ba), radium (Ra), strontium (Sr), calcium (Ca), magnesium (Mg)), and solid solutions and combinations comprising at least one of the foregoing.

This OIC/OS material is a balance of a sufficient amount of zirconium to preferably minimize the reduction energies of $Ce^{4+}$ and the activation energy for mobility of 'O' within the lattice, a sufficient amount of cerium to provide the desired oxygen storage capacity, and sufficient amount of yttrium, or yttrium/rare earth metal to stabilize the solid solution in the cubic crystalline phase, even after severe aging at about 1,000 to about 1,150° C. in an oxidizing or reducing atmosphere. Typically, this solid solution comprises up to about 95 mole percent (mole %) zirconium, up to about 40 mole % cerium, up to about 10 mole % yttrium, and optionally up to about 10 mole % optional earth metal; with up to about 90 mole % zirconium, up to about 35 mole % cerium, and about 2 to about 10 mole % yttrium, and 0 to about 7.5 mole % earth metal, preferred; and about 50 to about 85 mole % zirconium, about 10 to about 30 mole % cerium, about 4 to about 7.5 mole % yttrium, and about 4 to about 7.5 mole % earth metal, especially preferred.

This OIC/OS material is characterized by having a cubic crystal structure, particularly a cubic fluorite crystal structure, even for compositions that have in excess of 50 mole % zirconium. The percentage of this OIC/OS material having the cubic structure is greater than 95%, greater than 99% typically and essentially 100% generally obtained (i.e. an immeasurable amount of tetragonal phase based on current measurement technology).

For the above compositions the cubic phase is stable after aging at about 1,150° C. in air for 36 hours with no segregation observed. Consequently these OIC/OS materials possess structural stability under severe three-way conversion catalyst operating conditions in contrast to current conventional materials which undergo extensive segregation to a mixture of phases after such thermal treatment.

Figure 1:
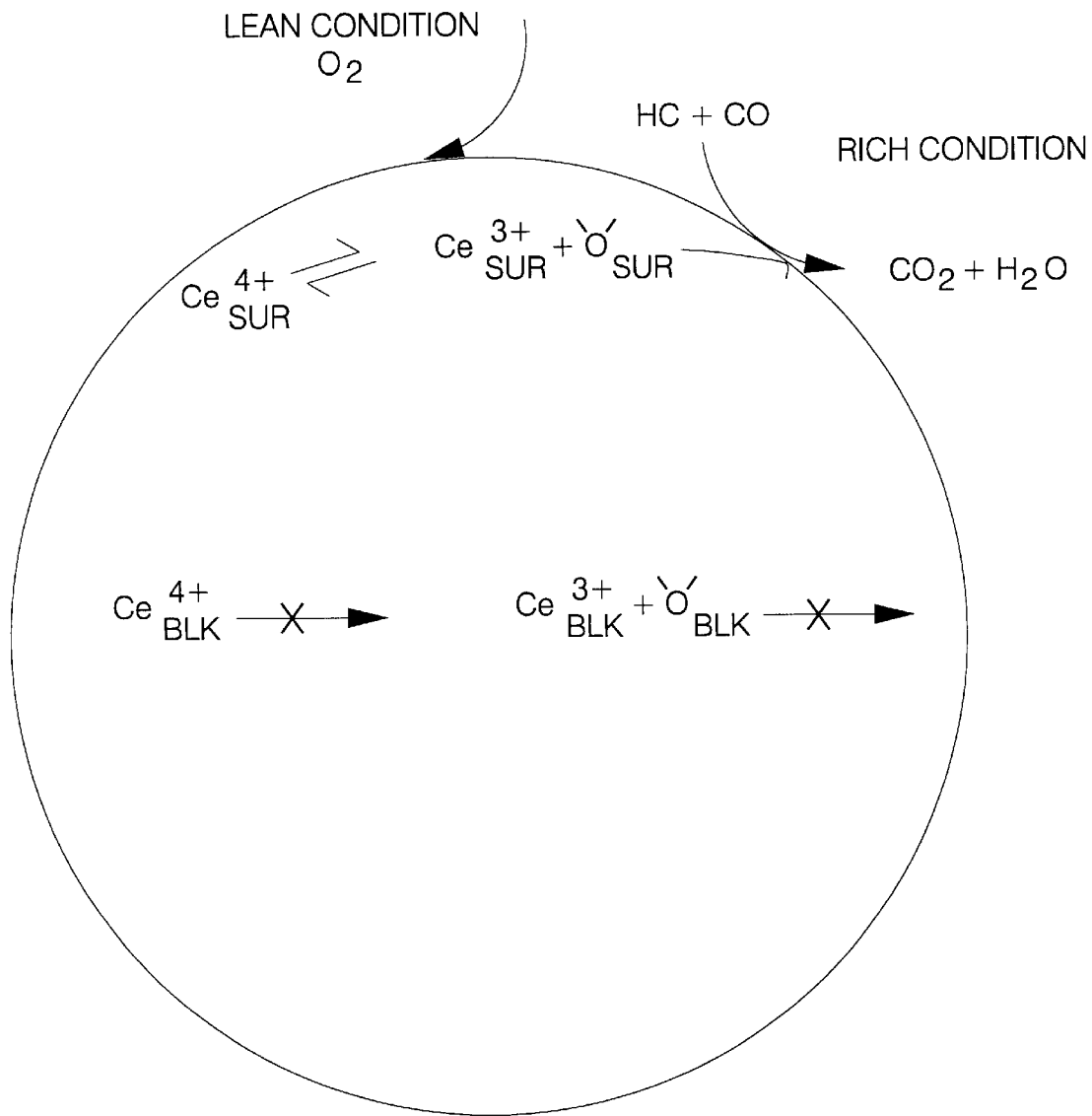
FIGS. 1 and 2 illustrate the fact that when binary or ternary solid solutions are formed between $CeO_2$ and $ZrO_2$, bulk oxygen becomes available for oxidation at the crystal surfaces as a result of bulk $Ce^{4+}$ reduction followed by oxygen migration to the surface of the solid solution crystallites.
Figure 2:
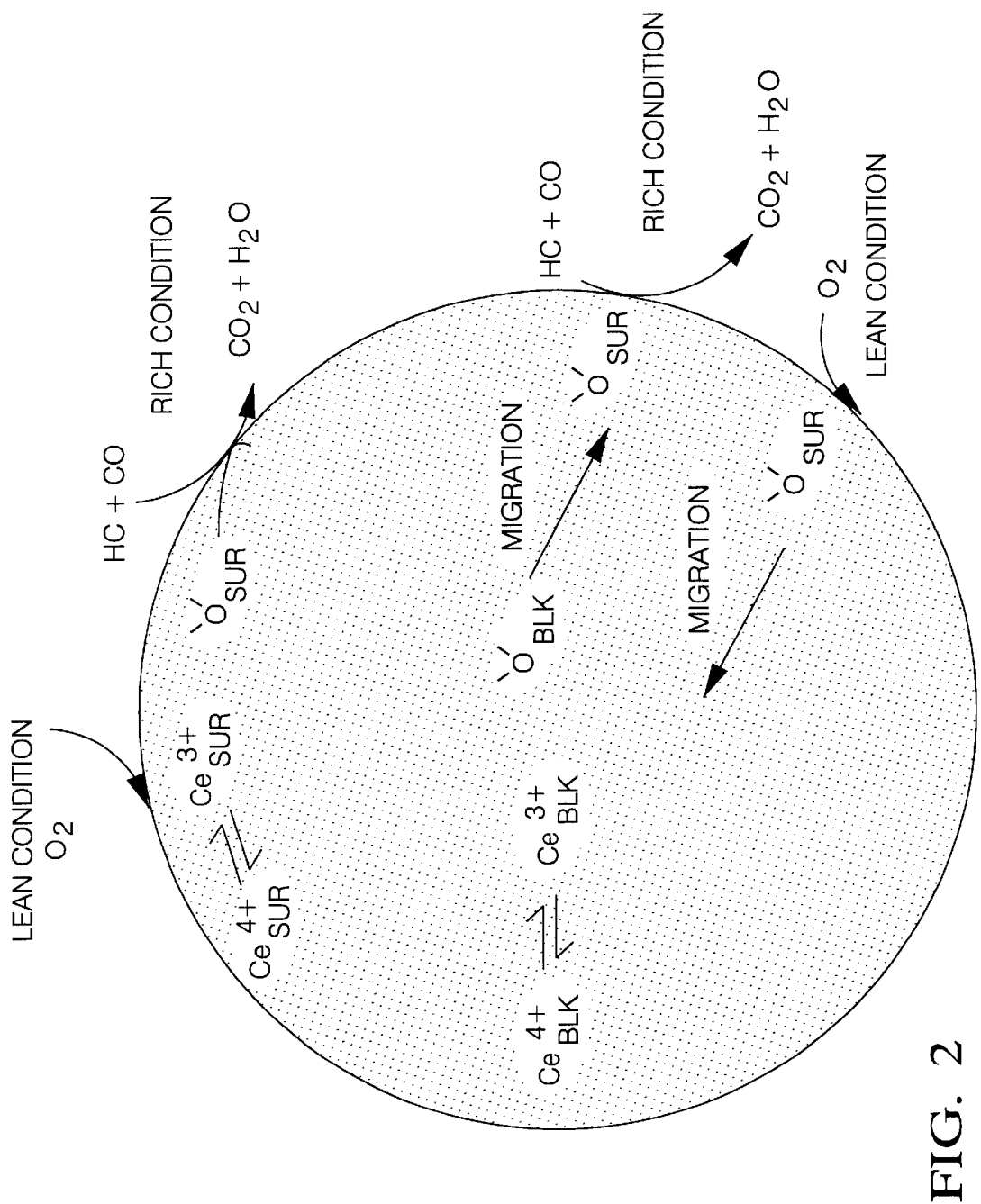
Figure 3:
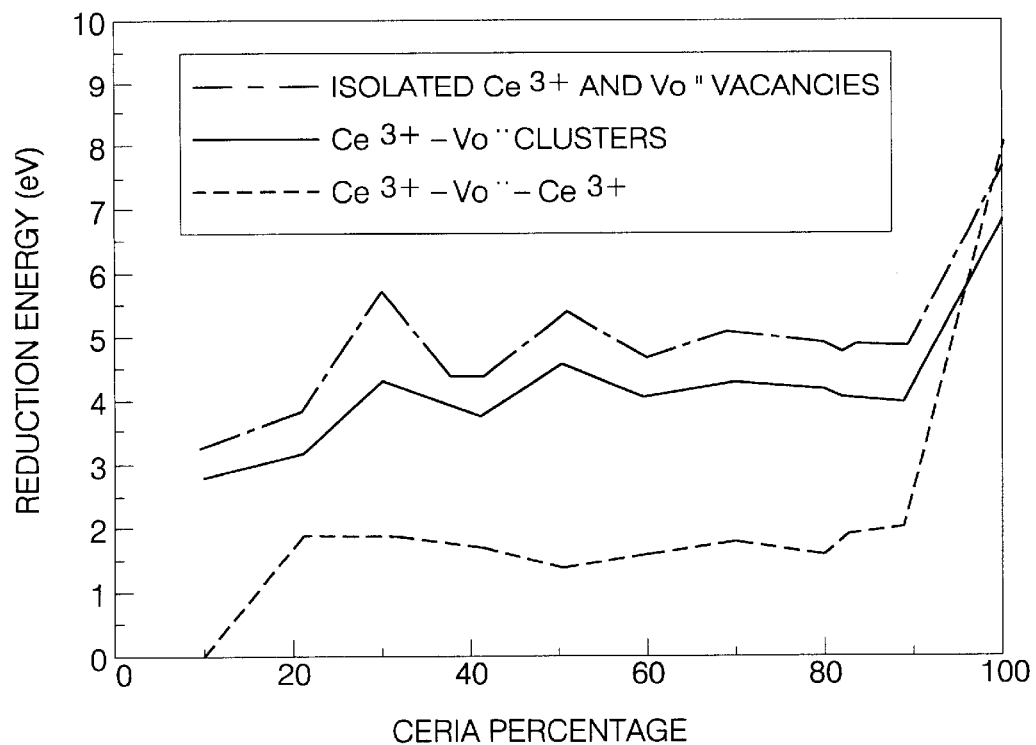
FIGS. 3 and 4 are graphical representations illustrating that Zr-rich compositions possess lower activation energies for 'O' mobility and lower energies for $Ce^{4+}$ reduction.
Figure 4:
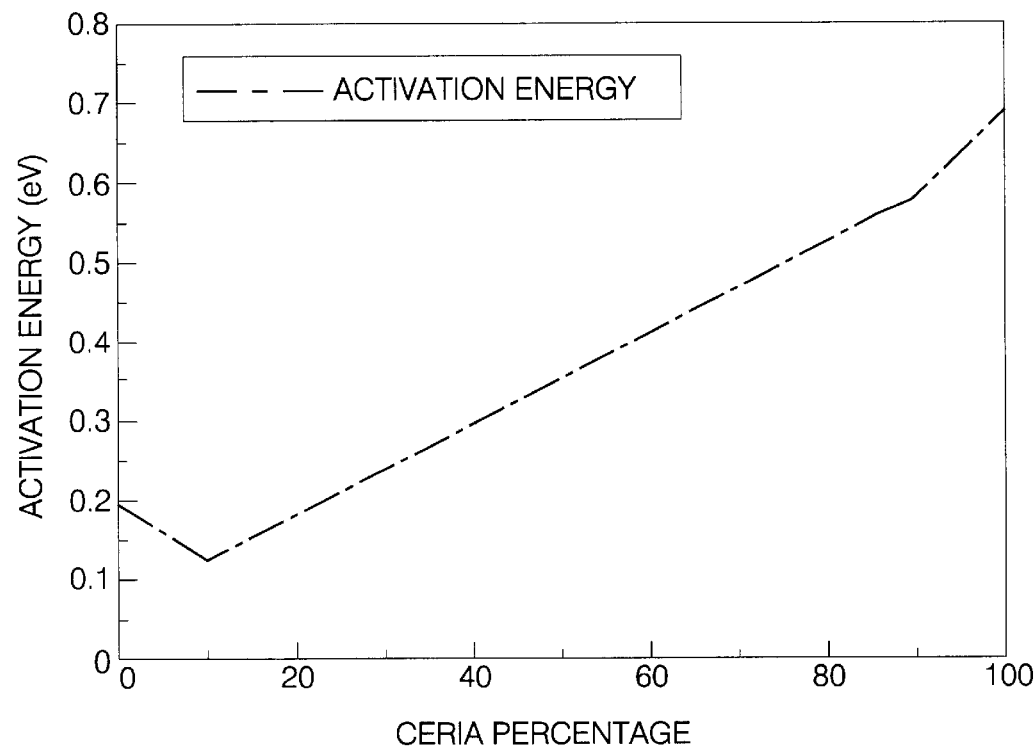
Figure 5:
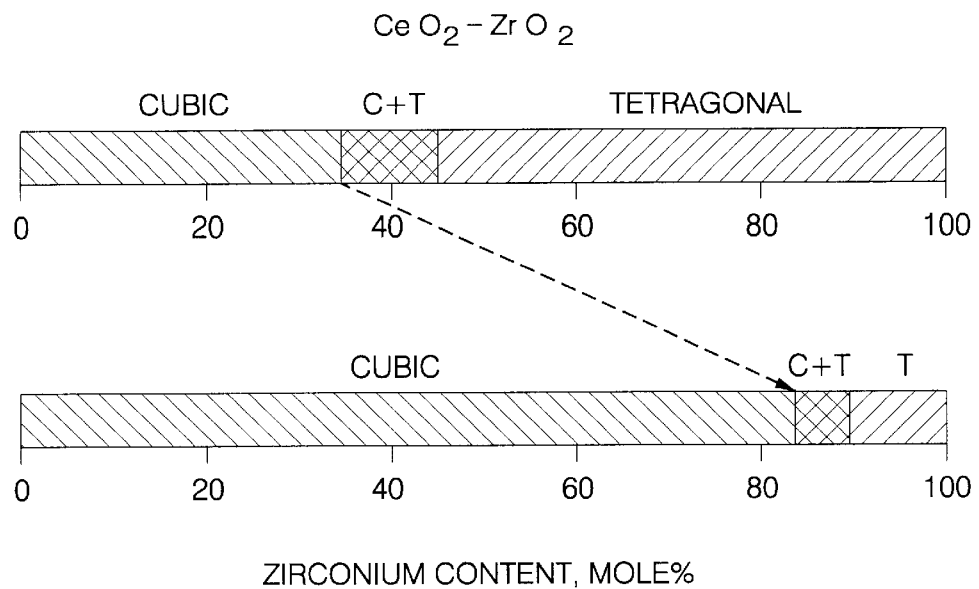
FIGS. 5 and 6 illustrate the stability of the cubic crystal structure for various compositions.
Figure 6:
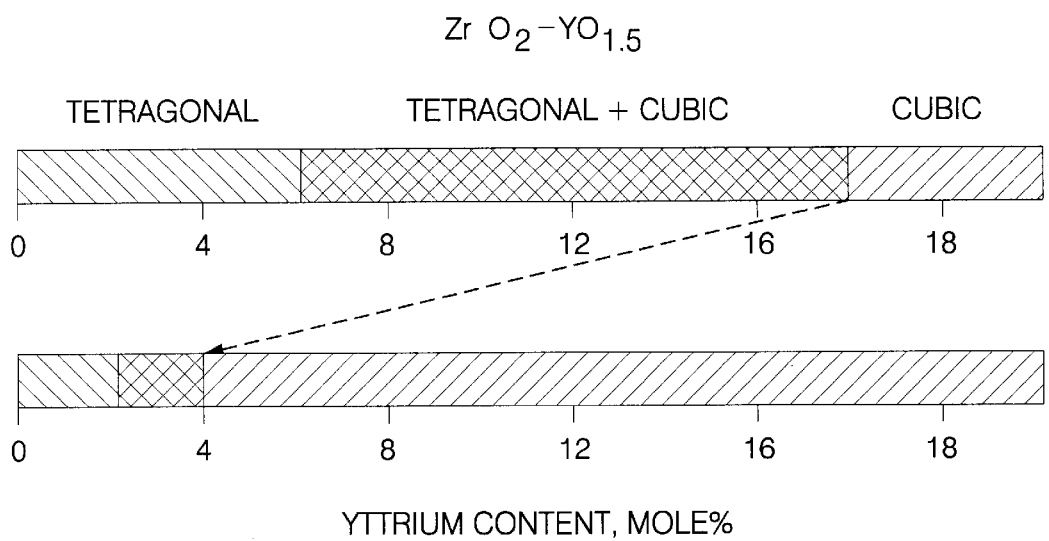

The different relationship between crystal structure and solid solution composition of the prior art materials as compared to materials of the current invention is demonstrated in FIG. 5. Here is shown that for materials of the current invention the cubic crystal structure is formed over a much wider Zr-content range than prior art materials.

Furthermore, this material possesses unexpectedly facile OIC/OS properties as characterized by temperature programmed reduction (TPR) analysis when compared to conventional compositions of similar ceria and zirconia contents. Further, severe aging at about 1,000° C. to about 1,150° C. in an oxidizing or reducing atmosphere does not deplete oxygen storage capacity characteristics in terms of reduction and oxygen storage capacity (fraction of cerium reduced at low temperature) in contrast to prior art compositions where we observe a significant loss of oxygen storage capacity after similar aging (Table 1).

positions containing low levels of lanthanum and yttrium ($Zr_{0.50}Ce_{0.35}La_{0.075}Y_{0.075}O_{1.925}$, $Zr_{0.65}Ce_{0.25}La_{0.04}Y_{0.06}O_{1.95}$, $Zr_{0.65}Ce_{0.25}La_{0.01}Y_{0.09}O_{1.95}$). The temperature at which the maximum rate of reduction occurs for the samples is below 400° C., while binary compositions of similar cerium/zirconium content and ratios typically show maximum reduction rates at temperatures well in excess of 400° C. Consequently, the addition of Y or Y and La to the solid solution results in more facile redox properties.

The OIC/OS materials maintain the cubic fluorite crystalline structure, even for compositions where the zirconium content is well in excess of 40 mole % after aging at 1,150° C. in air or 1,000° C. in $H_2/Ar$. Consequently, these materials should be fully stable in the cubic crystalline structure under the most severe three-way conversion (TWC) catalyst operating conditions.

Figure 17:
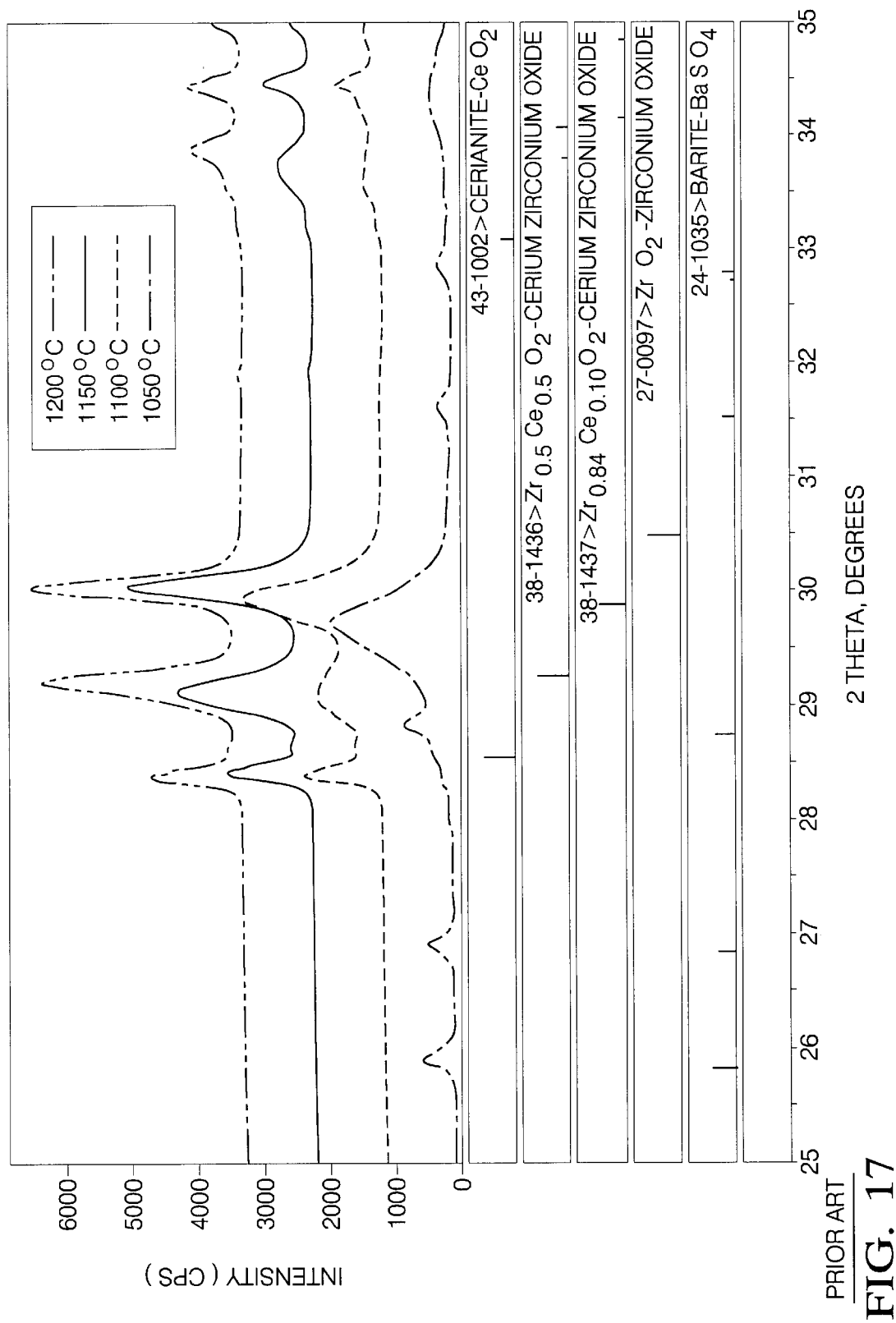
FIG. 17 is a XRD pattern of a conventional tetragonal Zr-rich ternary $Ce,Zr,LaO_x$ composition after high temperature aging in nitrogen where extensive phase disproportionation was observed.
Figure 18:
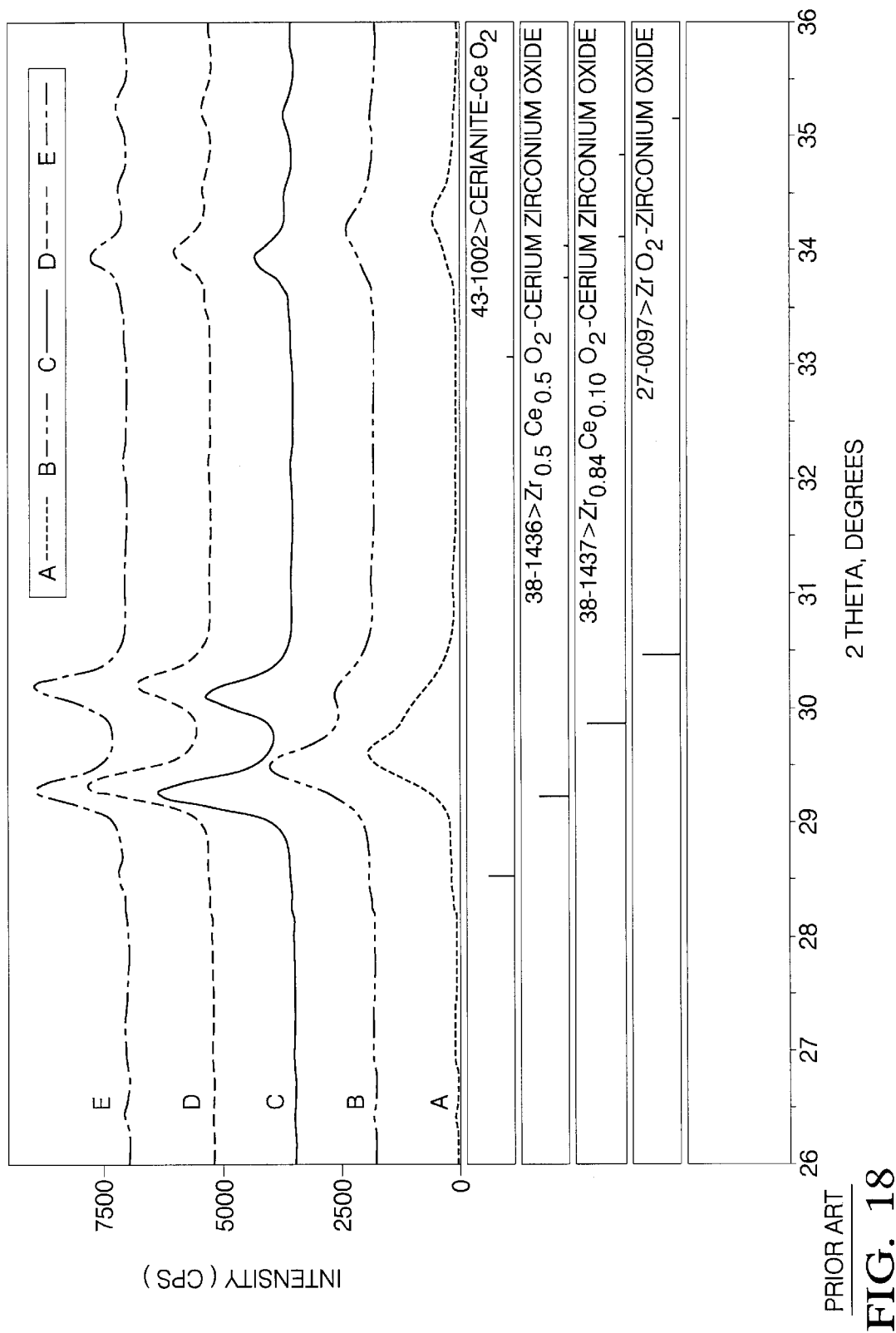
FIG. 18 is a XRD pattern of a conventional tetragonal Zr-rich ternary $Ce,Zr,LaO_x$ composition after various types of durability protocols used to simulate long term use of the composition through thermal and chemical aging, showing extensive phase disproportionation.

As is illustrated in FIGS. 17 and 18, aging of prior art solid solutions under severe TWC conditions results in extensive phase disproportionation. In FIG. 17 are shown XRD patterns for solid solution, containing 72 mole % of Zr, aged at 1,050° C., 1,100° C., 1,150° C. and 1,200° C. for 6

TABLE 1

| Formula | Aging, °C. | Peak, °C. | OSC1* | Aging, °C. | Peak °C. | OSC2* | Δ OSC**, (in %) |
|---|---|---|---|---|---|---|---|
| $Zr_{0.7}Ce_{0.3}O_2$ | 800 | 620 | 1.05 | 1,150 | 760 | 0.60 | 43 |
| $Zr_{0.65}Ce_{0.28}Y_{0.07}O_{1.965}$ | 800 | 390 | 0.97 | 1,150 | 375 | 0.93 | 4 |
| $Zr_{0.65}Ce_{0.25}La_{0.04}Y_{0.06}O_{1.95}$ | 800 | 390 | 0.92 | 1,150 | 310 | 0.90 | 2 |

*in millimole hydrogen per gram (mMol $H_2$/g)
**Δ OSC = 100(OSC1 − OSC2)/OSC1

Doping ceria ($CeO_2$) with only Y or La does not alter the ceria crystal structure (cubic) or enhance the oxygen storage capacity characteristics. In fact large negative effects on oxygen storage capacity were observed for La or Y only doped ceria after high temperature aging. In the case of zirconia stabilization, addition of Y stabilizes the tetragonal phase up to 18 mole % Y loading, but the cubic phase is only stabilized for compositions higher than 18 mole % Y and typically greater than about 20 mole % Y.

Figure 7:
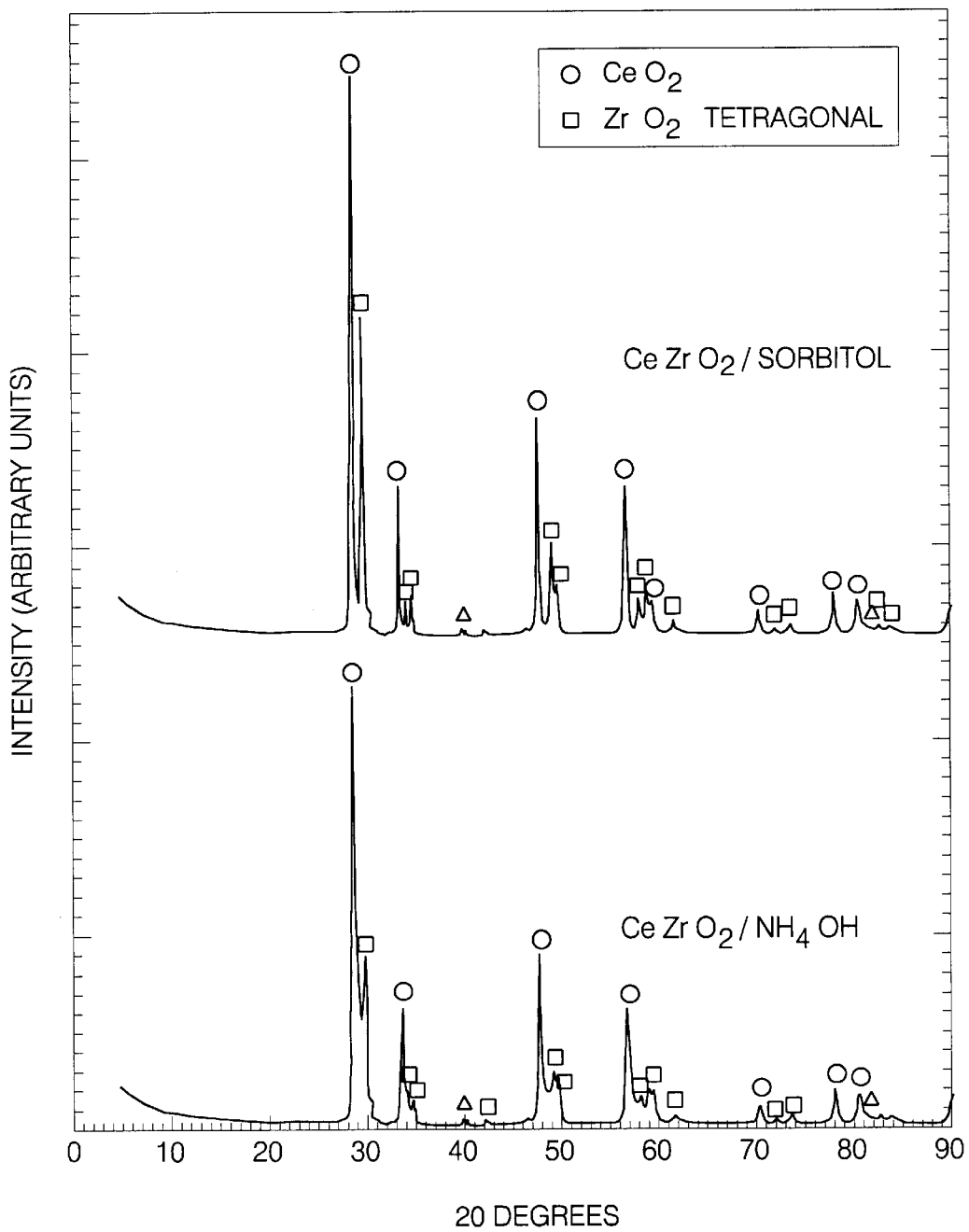
FIG. 7 is an XRD pattern for a prior art binary zirconia/ceria solid solution, comprising 53 mole % Zr, after aging at 1,100° C. for 24 hours in the presence of air.
Figure 8:
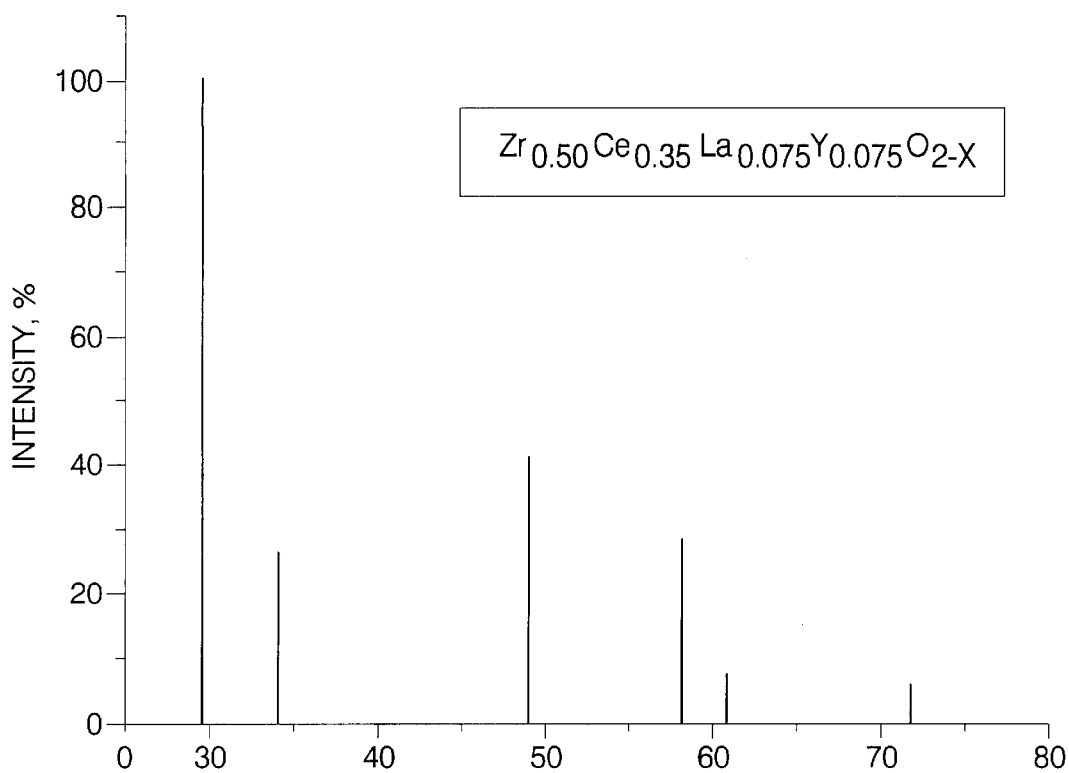
FIGS. 8–13 are XRD patterns of various embodiments of solid solutions of the present invention, after aging at 1,150° C. for 36 hours in the presence of air.
Figure 9:
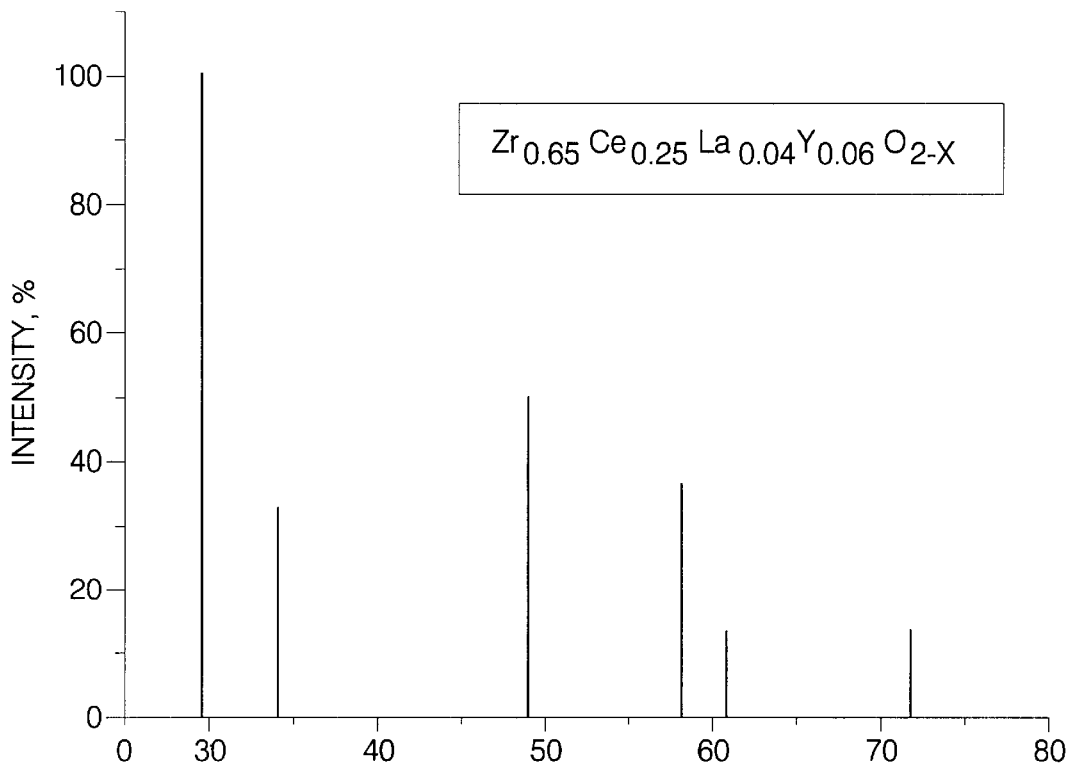
Figure 10:
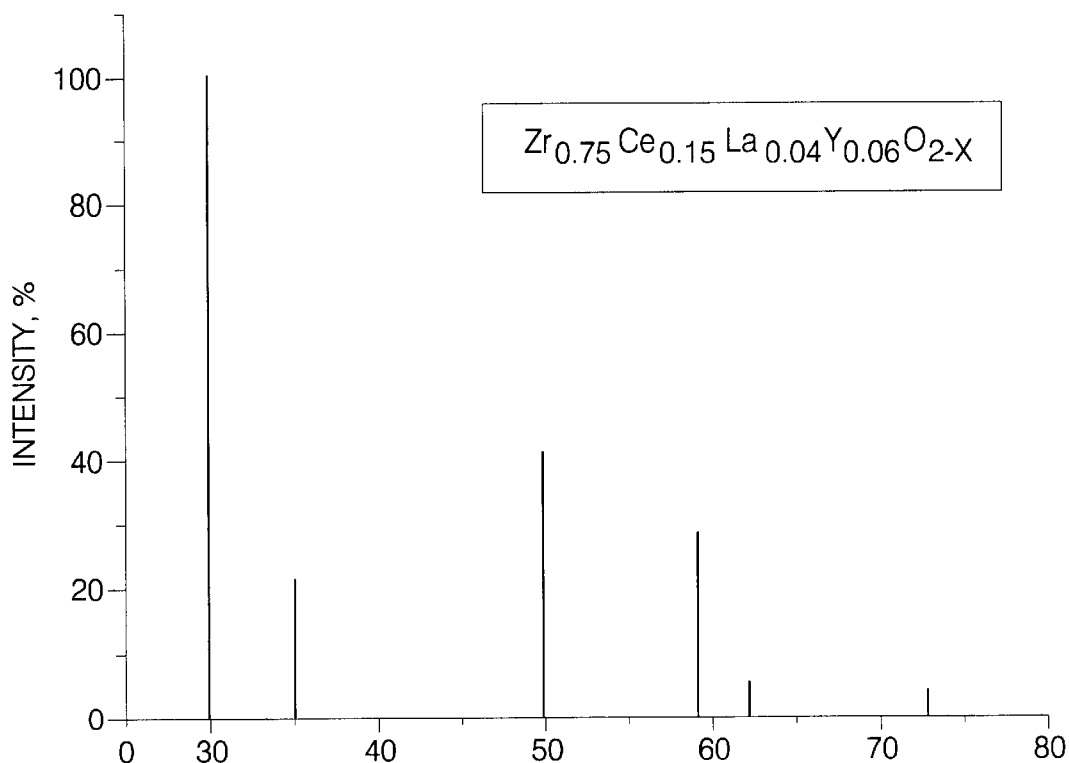
Figure 11:
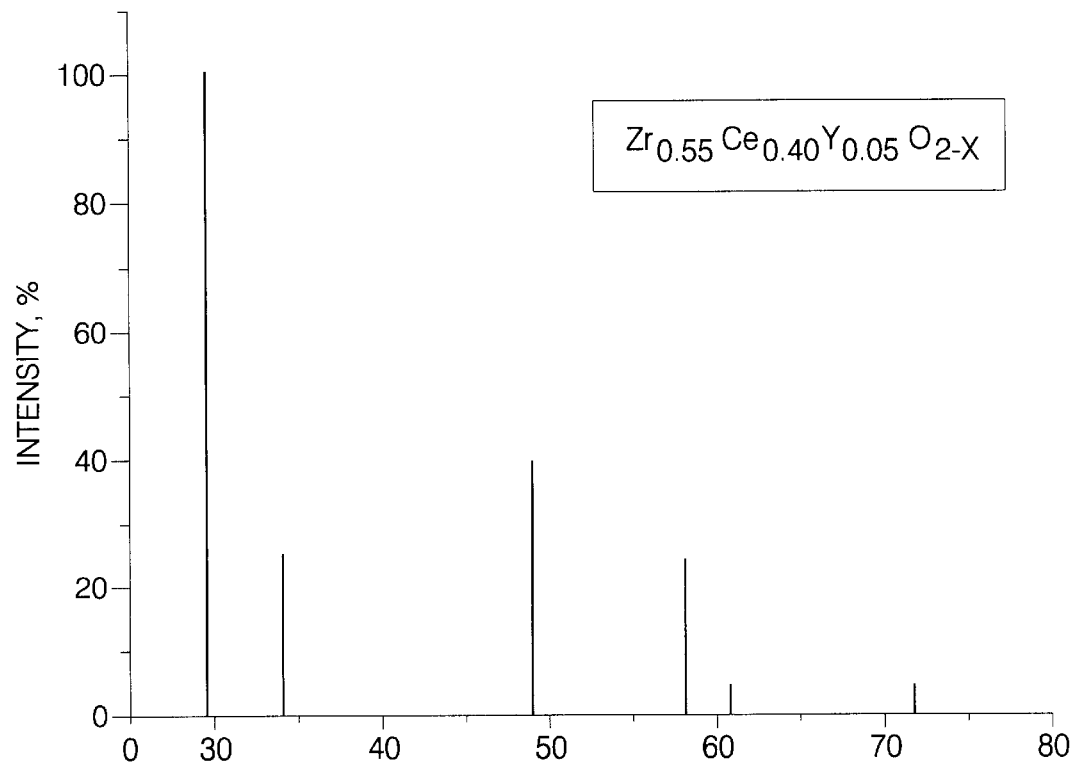
Figure 12:
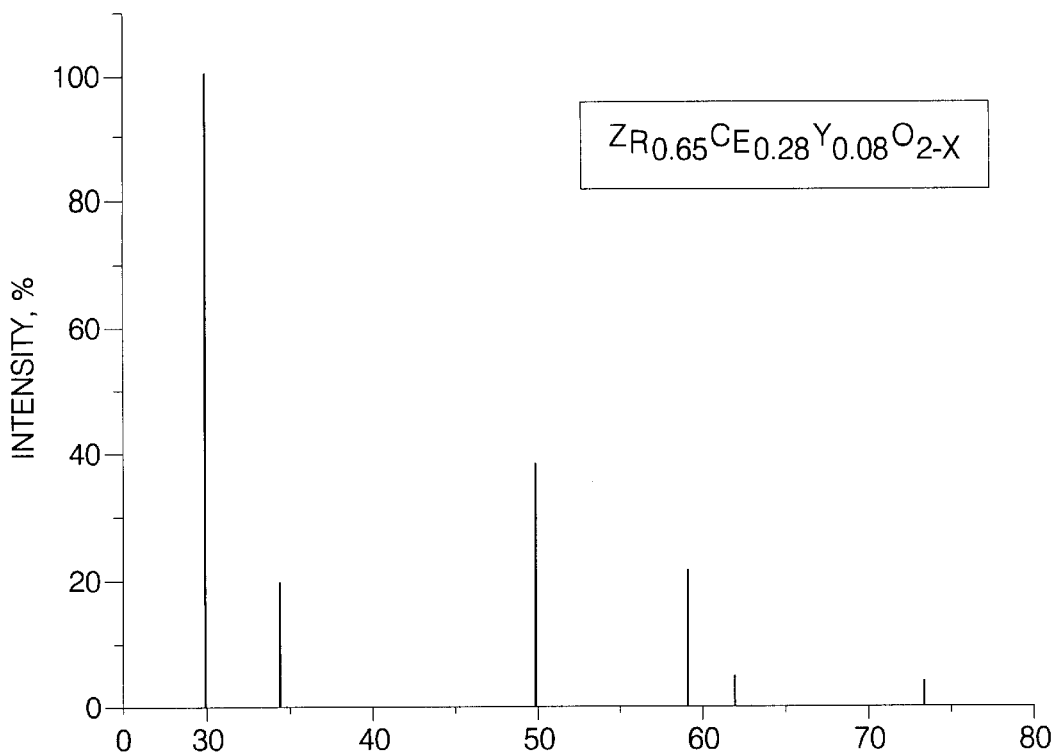
Figure 13:
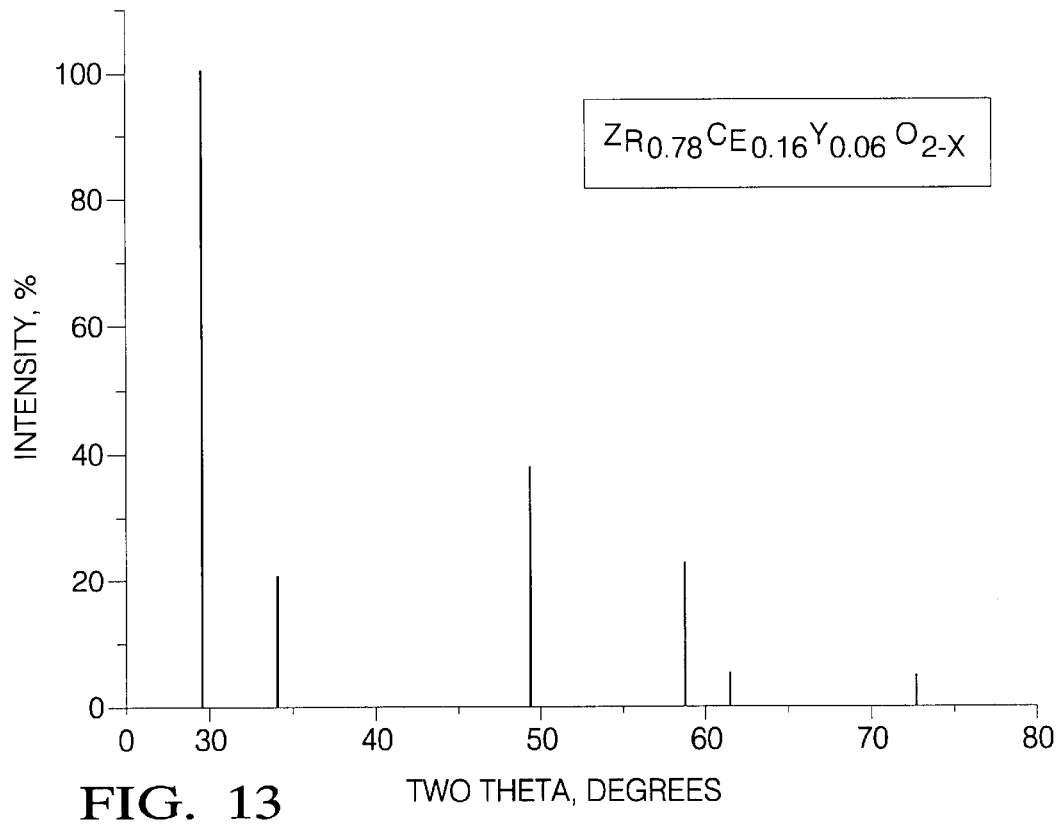

The prior art binary zirconia/ceria solid solutions with a zirconium content of 53 mole % after aging at 1,100° C. for 24 hours in the presence of air was characterized by its X-ray diffraction (XRD) pattern (FIG. 7). Based upon the peak positions, both cubic and tetragonal crystalline phases are present. Thus, for binary compositions of intermediate (about 50 mole %) zirconium content, segregation of the cubic and tetragonal phases occurs.

Figure 14:
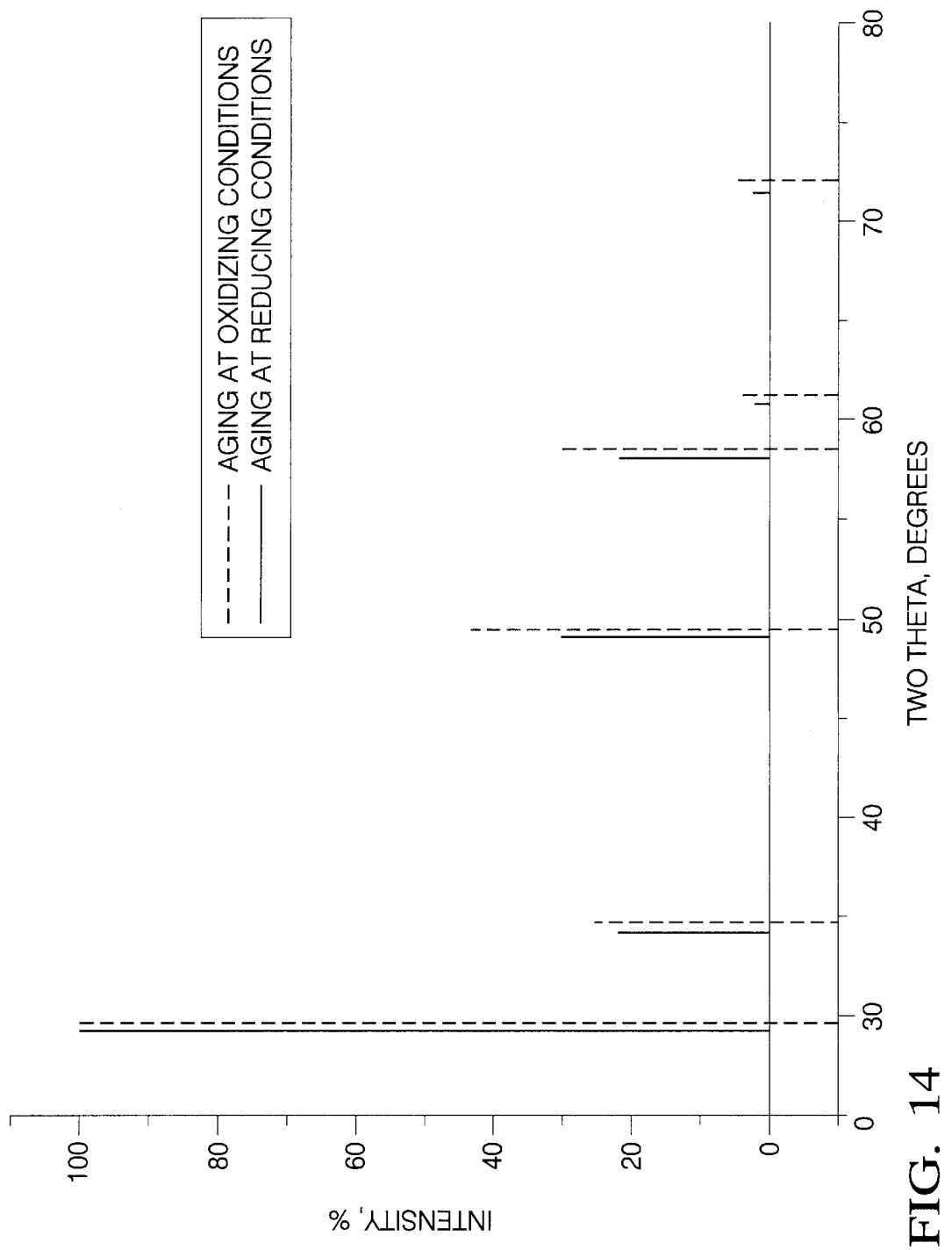
FIG. 14 is a pair of XRD patterns of $Zr_{0.65}Ce_{0.25}La_{0.04}Y_{0.06}O_{1.95}$ demonstrating phase stability under high temperature oxidizing and reducing conditions.

FIGS. 8 through 13 illustrate XRD patterns of six zirconium-rich zirconia/ceria/yttria compositions after their aging at 1,150° C. for 36 hours. The OIC/OS materials used to produce these patterns comprised about 55 to about 78 mole % zirconium, and about 5 to about 7 mole % yttrium. For all of the above compositions, only the cubic phase was detected. This establishes that the addition of low levels of yttrium and/or a combination of yttrium and lanthanum stabilizes the cubic phase even for the highest zirconium concentration (up to and even exceeding about 75 mole %). FIG. 14 further illustrates that the Ce,Zr,La,Y material (made as described in Example 5) is stable not only in high temperature oxidizing conditions but also in high temperature reducing conditions.

Figure 15:
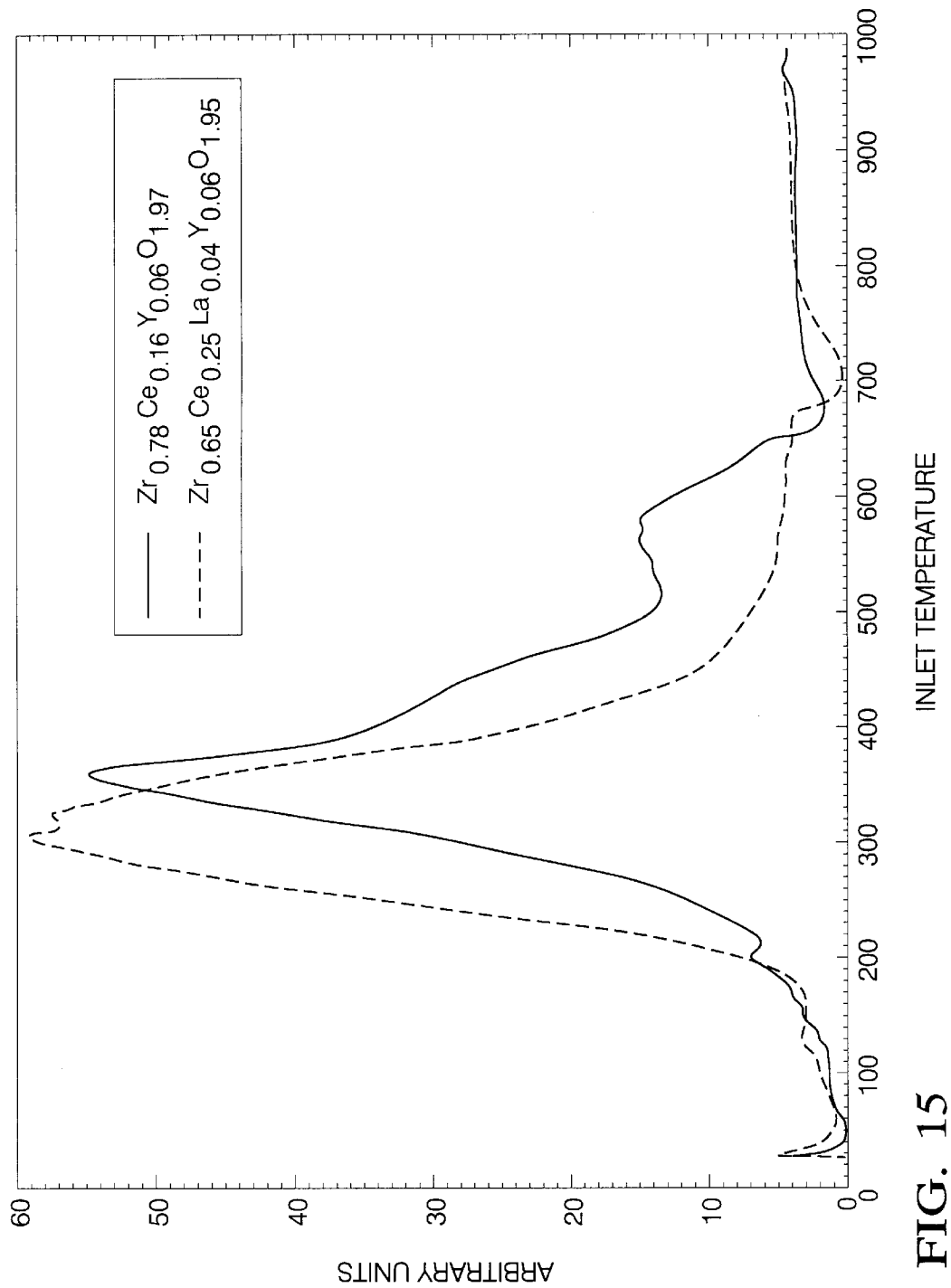
FIGS. 15 and 16 compare temperature programmed reduction spectra for conventional $Ce,Zr,LaO_x$ solid solution materials to various embodiments of the present invention where lower reduction temperatures are observed for the present invention.
Figure 16:
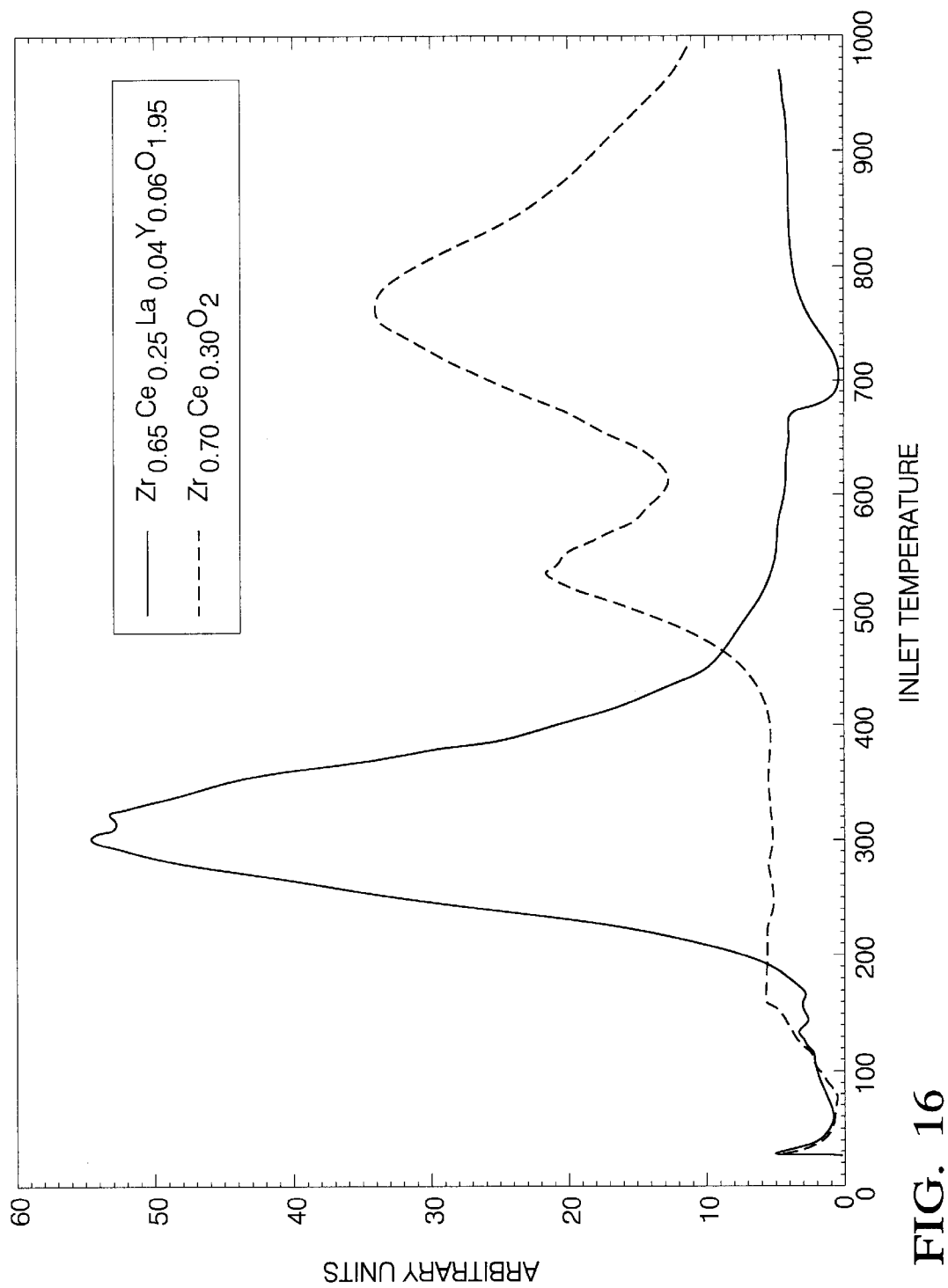

FIGS. 15 and 16 illustrate a temperature programmed reduction spectrum of three quaternary zirconium rich comhours in 10% $H_2O$/90% $N_2$. This aging atmosphere simulates severe engine aging of TWC catalysts. It is noted that the tetragonal phase of the Zr-rich solid solution disproportionates to a more Ce-rich phase and a more Zr-rich tetragonal phase. Similar phase disproportionation occurs again for the solid solution of reference catalyst A under real world engine aging as shown in FIG. 18 where the phase composition for four different aging conditions are shown. For the XRD pattern shown in (a) the aging, which was primarily high temperature and an oxidizing atmosphere, had little effect on the phase composition of the solid solution. Patterns (b), (c), (d) and (e), which represent more severe conditions in terms of temperature and increased levels of reducing power for the aging exhaust gas, observe progressively greater degree of disproportionation into more Ce-rich cubic and more Zr-rich tetragonal phases.

Figure 19:
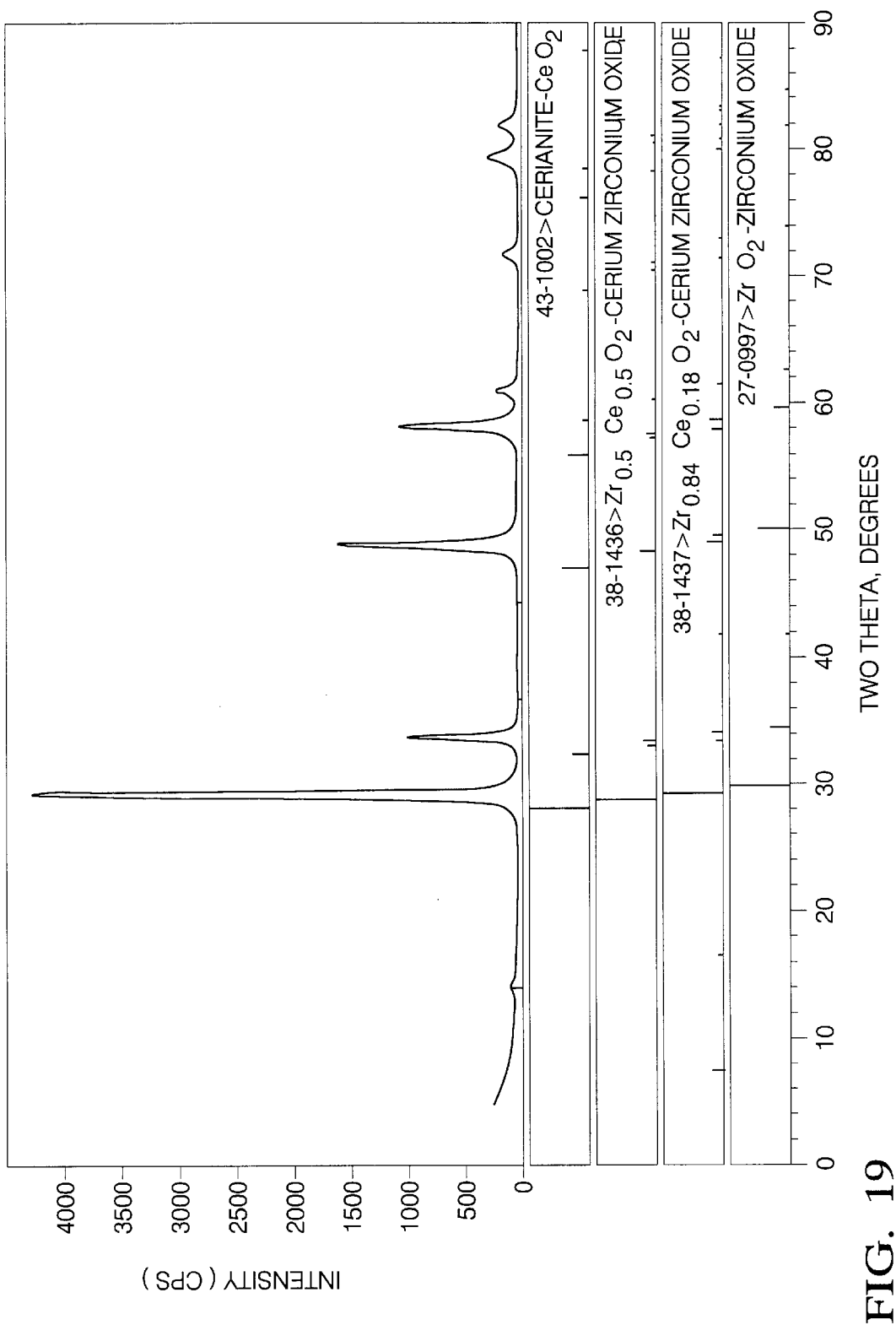
FIG. 19 is a XRD pattern of $Ce,Zr,La,YO_x$ compositions of the present invention after high temperature aging in nitrogen where no phase disproportionation was observed.

In contrast to these results set in FIGS. 17 and 18, the result set in FIG. 19 illustrate phase compositions for one embodiment of the OIC/OS material (solid solution used in test catalyst C) (see Table 2).

The following examples are provided to further illustrate the present invention and not to limit the scope thereof.

EXAMPLES

The following examples were used to prepare OIC/OS materials of the present invention.

Example 1

Preparation of the $Zr_{0.55}Ce_{0.40}Y_{0.05}O_{1.975}$ solid solution.

150 g of $ZrO(NO_3)_2$ solution (21 wt % Zr), 160 g of $Ce(NO_3)_3$ solution (22 wt % Ce), and 12.1 g $Y(NO_3)_3 \cdot 6H_2O$ were dissolved in 600 g of deionized water. The metal containing solution was then slowly added with vigorous stirring to 2 liters (L) of 3 molar (M) $NH_4OH$, which resulted in precipitation of the metals as a mixed hydrous oxide. The reaction mixture was stirred for 3 hours and then the precipitate was filtered and thoroughly washed with deionized water to remove occluded $NH_4NO_3$. The precipitate was transferred to a flat ceramic dish and calcined at 600° C. in air for 2 hours. The calcined powder was wet milled for 30 min. in a vibratory mill and then aged at 1,150° C. for 36 hours in air. XRD and surface area measurements showed that the resultant solid solution had a cubic fluorite structure with a unit cell dimension "a" of 5.24 angstroms (Å) and surface area after aging of 5.65 square meters per gram ($m^2/g$).

Example 2

Preparation of the $Zr_{0.05}Ce_{0.40}Y_{0.05}O_{1.975}$ solid solution.

The same as for Example 1 using 309 g of $ZrO(NO_3)_2$ solution (21 wt % Zr), 127 g of $Ce(NO_3)_3$ solution (22 wt % Ce), and 30.1 g $Y(NO_3)_3 \cdot 6H_2O$. XRD and surface area analysis showed that the resultant solid solution had a cubic fluorite structure with a unit cell dimension "a" of 5.20 Å and surface area after aging of 5.60 $m^2/g$.

Example 3

Preparation of the $Zr_{0.78}Ce_{0.16}Y_{0.06}O_{1.97}$ solid solution.

The same as for Example 1 using 108 g of $ZrO(NO_3)_2$ solution (21 wt % Zr), 32.5 g of $Ce(NO_3)_3$ solution (22 wt % Ce) and 7.20 g $Y(NO_3)_3 \cdot 6H_2O$. XRD and surface area analysis showed that the resultant solid solution had a cubic fluorite structure with a unit cell dimension "a" of 5.16 Å and a surface area after aging of 3.62 $m^2/g$.

Example 4

Preparation of the $Zr_{0.50}Ce_{0.35}La_{0.075}Y_{0.075}O_{1.925}$ solid solution.

The same as for Example 1 using 108 g of $ZrO(NO_3)_2$ solution (21 wt % Zr), 111 g of $Ce(NO_3)_3$ solution (22 wt % Ce), 14.4 g of $La(NO_3)_3 \cdot 6H_2O$, and 13.4 g $Y(NO_3)_3 \cdot 6H_2O$.

XRD and surface area analysis showed that the resultant solid solution had a cubic fluorite structure with a unit cell dimension "a" of 5.22 Å and a surface area after aging of 9.79 $m^2/g$.

Example 5

Preparation of the $Zr_{0.65}Ce_{0.25}La_{0.04}Y_{0.06}O_{1.95}$ solid solution.

The same as for Example 1 using 324 g of $ZrO(NO_3)_2$ solution (21 wt % Zr), 183 g of $Ce(NO_3)_3$ solution (22 wt % Ce), 19.9 g of $La(NO_3)_3 \cdot 6H_2O$ and 26.4 g $Y(NO_3)_3 \cdot 6H_2O$. XRD and surface area analysis showed that the resultant solid solution had a cubic fluorite structure with a unit cell dimension "a" of 5.20 Å and a surface area after aging of 3.75 $m^2/g$.

Example 6

Preparation of the $Zr_{0.65}Ce_{0.20}La_{0.04}Y_{0.06}Ca_{0.05}O_{1.90}$ solid solution.

The same as for Example 1 using 216 g of $ZrO(NO_3)_2$ solution (21 wt % Zr), 100 g of $Ce(NO_3)_3$ solution (22 wt % Ce), 11.8 g of $La(NO_3)_3 \cdot 6H_2O$, 20.6 g $Y(NO_3)_3 \cdot 6H_2O$, and 9.1 g Ca $Y(NO_3)_3 \cdot 6H_2O$. XRD and surface area analysis showed that the resultant solid solution had a cubic fluorite structure with a unit cell dimension "a" of 5.20 Å and a surface area after aging of 9.40 $m^2/g$.

Example 7

Preparation of the $Zr_{0.65}Ce_{0.20}Y_{0.05}Ca_{0.10}Ca_{0.10}O_{1.875}$ solid solution.

The same as for Example 1 using 150 g of $ZrO(NO_3)_2$ solution (21 wt % Zr), 68 g of $Ce(NO_3)_3$ solution (22 wt % Ce), 10.2 g $Y(NO_3)_3 \cdot 6H_2O$, and 12.6 g $Ca(NO_3)_3 \cdot 6H_2O$. XRD and surface area analysis showed that the resultant solid solution had a cubic fluorite structure with a unit cell dimension "a" of 5.19 Å and a surface area after aging of 3.8 $m^2/g$.

Example 8

Performance evaluation of the solid solution of Example 5.

The performance of the solid solution of Example 5 as an OIC/OS component in a TWC catalyst was measured by the preparation of a Pd, Rh TWC test catalyst (catalyst C) and subsequent comparison to two state-of-the-art reference catalysts. One of the reference catalysts (reference catalyst A) contained a conventional solid solution having similar Ce and Zr contents to the solid solution in Example 5 except that the crystal structure was in the tetragonal form. Reference catalyst B had the same loading but higher Ce content. In the finished catalysts the Ce loading of reference catalyst A was 1,013 grams per cubic foot ($g/ft^3$), 1,541 $g/ft^3$ for reference B, and 1,108 $g/ft^3$ for the test catalyst. Further, reference catalyst A had higher Pd and Rh loadings than the test catalyst. The compositions of the three catalysts are summarized in Table 2.

TABLE 2

| | Solid Solution Composition Mole % | | | | | PM* Loading ($g/ft^3$) | | Solid Solution | Ce Loading |
|---|---|---|---|---|---|---|---|---|---|
| | Ce | Zr | La | Y | M | Pd | Rh | Loading ($g/in^{-3}$) | $g/ft^3$ (OSC) |
| A | 23 | 69 | 8 | — | — | 78.8 | 11.25 | 2.5 | 1,013 |
| B | 37 | 51 | 8 | — | 4 | 70 | 10.00 | 2.5 | 1,541 |
| C | 25 | 65 | 4 | 6 | — | 70 | 10.00 | 2.5 | 1,108 |

PM is precious metal

Catalyst preparation, aging and stand dynamometer testing were carried out as previously described in Examples 13, 14 and 15 of U.S. Pat. No. 5,064,803 (which is incorporated herein by reference). However, in the current case a 4-reactor aging was carried out where the $4^{th}$ catalyst consisted of a second reference catalyst B. Further, a more severe aging was carried out than described in U.S. Pat. No. 5,064,803 where the maximum bed temperature was 1,050° C. for 25% of the aging time.

Figure 20:
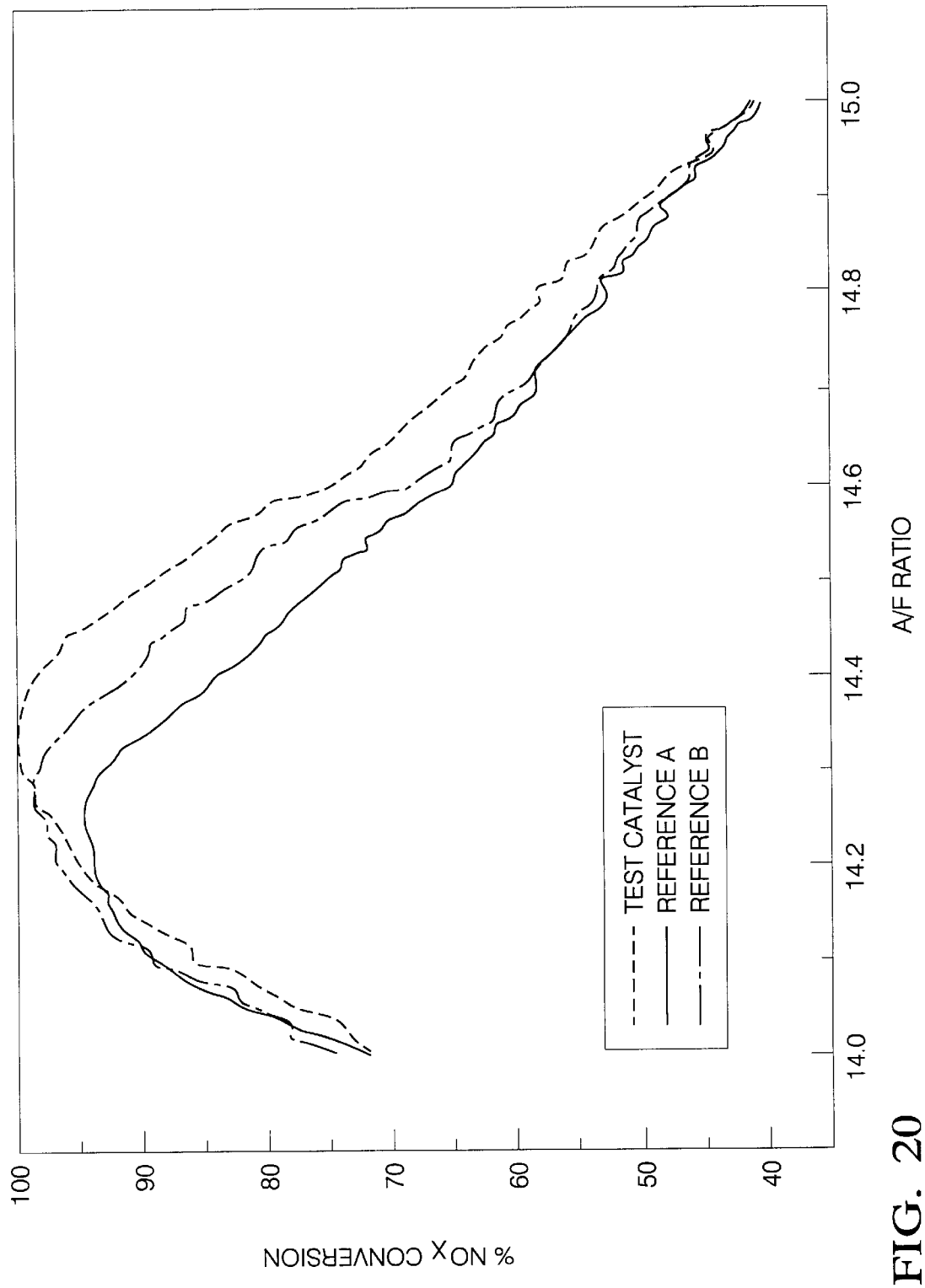
FIG. 20 shows A/F traverse performance comparisons of TWC catalysts at 400° C., gas hourly space velocity (GHSV) of 30,000; A/F amplitude is ±0.65 at 1 Hz; aging of 100 hours with a bed temperature of 1,050° C.
Figure 21:
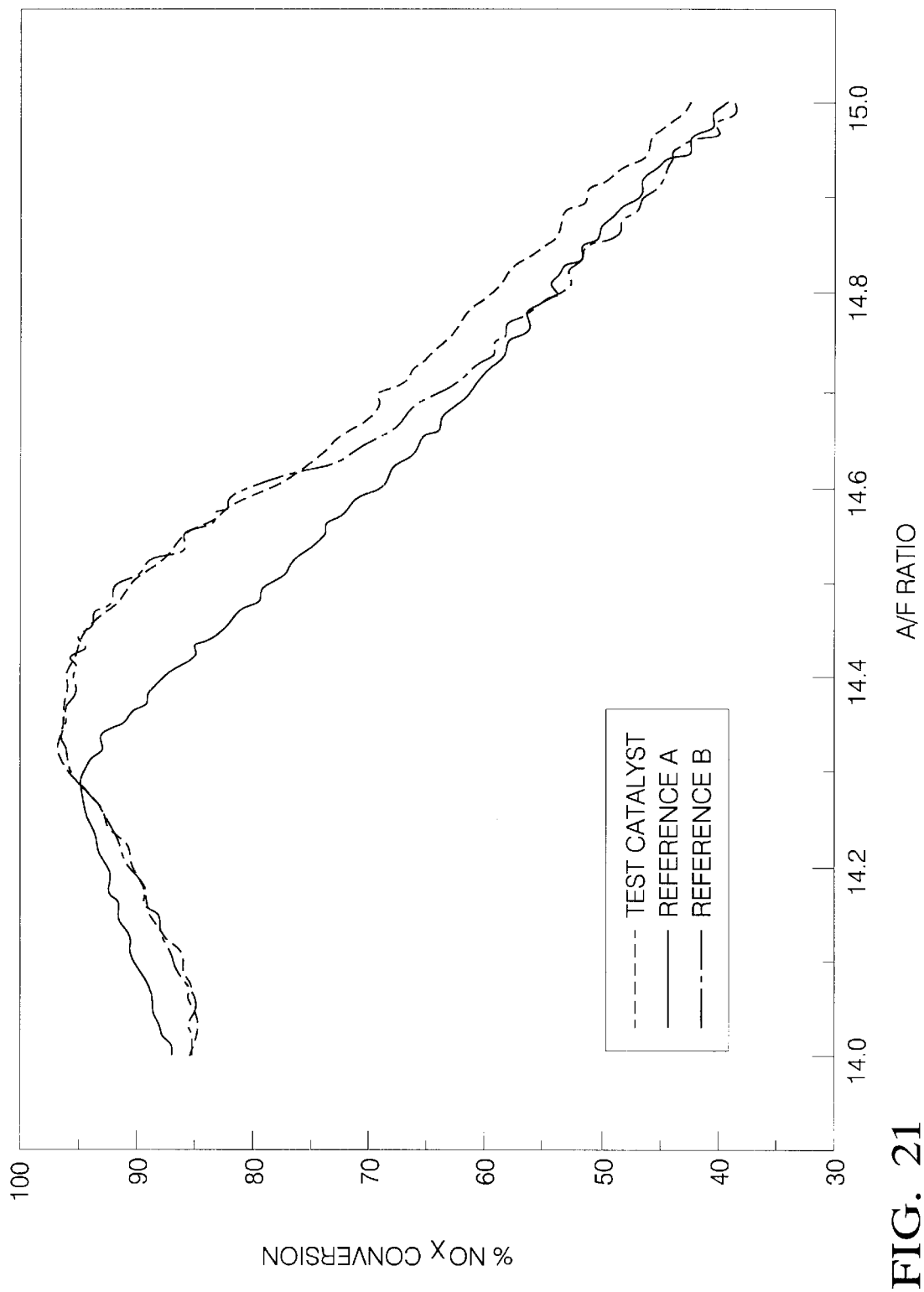
FIG. 21 shows A/F traverse performance comparisons of TWC catalysts at 450° C.; GHSV of 30,000; A/F amplitude is ±0.65 at 1 Hz; aging of 100 hours with a bed temperature of 1,050° C.

The results of these comparisons are summarized in Tables 3 and 4 and in FIGS. 20 and 21.

TABLE 3

| | Catalyst | | |
|---|---|---|---|
| | A | B | C |
| Integral Stoichiometry | | | |
| HC | 89 | 92 | 93 |
| CO | 62 | 72 | 74 |
| $NO_x$ | 70 | 75 | 81 |
| A/F = 14.56 | | | |
| HC | 89 | 92 | 93 |
| CO | 63 | 75 | 77 |
| $NO_x$ | 70 | 76 | 82 |
| A/F = 14.25 | | | |
| HC | 70 | 68 | 65 |
| CO | 30 | 30 | 29 |
| $NO_x$ | 92 | 96 | 97 |
| Light-off/$T_{50\%}$ Temperature ° C. | | | |
| HC | 402 | 396 | 399 |
| CO | 409 | 403 | 403 |
| $NO_x$ | 397 | 391 | 397 |

Test: 400° C.; GHSV of 30,000; A/F amplitude of ±0.65 at 1 hertz (Hz); Aging of 100 Hours with maximum bed temperature of 1,050° C.

TABLE 4

| | A | B | C |
|---|---|---|---|
| Integral Stoichiometry | | | |
| HC | 92 | 93 | 93 |
| CO | 64 | 75 | 74 |
| $NO_x$ | 73 | 82 | 83 |
| A/F = 14.56 | | | |
| HC | 92 | 93 | 94 |
| CO | 65 | 80 | 79 |
| $NO_x$ | 73 | 84 | 85 |
| A/F = 14.25 | | | |
| HC | 76 | 71 | 71 |
| CO | 25 | 24 | 24 |
| $NO_x$ | 92 | 92 | 92 |
| Light-off/$T_{50\%}$ Temperature ° C. | | | |
| HC | 402 | 396 | 399 |
| CO | 409 | 403 | 403 |
| $NO_x$ | 397 | 391 | 397 |

Test: 450° C.; GHSV of 30,000; A/F amplitude of ±0.65 at 1 hertz (Hz); Aging of 100 Hours with maximum bed temperature of 1,050° C.

In Tables 3 and 4 we see that the solid solution of the present invention shows equivalent or higher performance compared to the reference catalyst A of similar Ce content even though the precious metal (PM) loading of the test catalyst was lower. Better integral stoichiometric CO and $NO_x$ performance are observed for the test catalyst C. Further, the test catalyst performed equivalent to reference catalyst B even though the Ce component (OIC/OS function) of catalyst B (1,541 g/ft³) is much higher than in catalyst C (1,108 g/ft³). The advantages of the catalyst C for $NO_x$ control are further shown in FIGS. 20 and 21 where high $NO_x$ performance for catalyst C is observed.

The stability of the OIC/OS material is achieved by the inclusion of appropriate amounts of yttria, and optionally rare earth metal(s) and/or alkaline earth metal(s) in the solid solution matrix, at unexpectedly low levels (below about 6 mole % yttrium). Additionally, the low loadings of additives (Y or Y+La, etc.) required for stabilization of the cubic crystalline phase has the further advantage that higher loadings of ceria can be used and thus, increased oxygen storage capacity can be attained. Consequently, stable cubic fluorite crystal structures are attained for compositions that have $ZrO_2$ contents of about 40 to about 95 mole % (preferably about 50 to about 90 mole %), with very high phase stability, that is, with essentially no phase (i.e. no measurable) disproportionation after aging up to 1,200° C. in oxidizing conditions such as air or up to 1,000° C. in reducing conditions such as 5% $H_2/N_2$.

In contrast, conventional binary metastable cubic 50:50 mixture of ceria and zirconia result in phase segregation to a mixture of approximately 70% cubic fluorite and 30% tetragonal phases after aging at 1,150° C. in air. Further, even for conventional tetragonal binary zirconium rich $ZrO_2$—$CeO_2$ compositions, high temperature aging results in phase segregation and formation of cubic cerium-rich phases.

In addition to the stable cubic crystalline structure, the composite solid solutions exhibit unexpectedly facile oxygen ion conductivity and redox activity as characterized by temperature programmed reduction analysis when compared to prior art compositions of similar ceria and zirconia contents. Further, severe aging at about 1,000° C. to about 1,150° C. in an oxidizing or reducing atmosphere does not deplete the oxygen storage capacity characteristics in terms of temperature of reduction and oxygen storage capacity (fraction of cerium reduced at low temperatures), in contrast to prior art compositions, where a significant loss of oxygen storage capacity is observed after similar aging.

Due to the enhanced phase stability and oxygen ion conducting properties of these OIC/OS materials, it can be employed in numerous applications, including: in solid oxide fuel cells (SOFC) for energy conversion, in electrochemical oxygen sensors, in oxygen ion pumps, structural ceramics of high toughness, in heating elements, in electrochemical reactors, in steam electrolysis cells, in electrochromic materials, in magnetohydrodynamic (MHD) generators, in hydrogen sensors, in catalysts for methanol decomposition, as potential hosts for immobilizing nuclear waste, as oxygen storage materials in three-way-conversion (TWC) catalysts, as well as in other applications where oxygen storage capacity and/or oxygen ion conductivity are factors. When used as oxygen storage materials in three-way-conversion catalysts, for example, the OIC/OS material would be supported on a substrate as part of the three-way-conversion catalyst (e.g., noble metals, such as platinum, palladium, iridium, osmium, rhodium, ruthenium, a porous support such as a high surface area alumina, as well as other metals and metal oxides, and combinations and alloys comprising at least one of the foregoing). When exposed to an exhaust environment, this combined material would exhibit substantially equal or increased three-way-conversion capabilities compared to a conventional catalyst having a higher catalyst (e.g. metal) loading, and substantially equal capabilities compared to a conventional catalyst having a higher cerium content.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

We claim:

1. A method of converting nitrogen oxides to nitrogen comprising:

contacting an oxide of nitrogen to a catalyst comprising:
a zirconium-rich $CeO_2/ZrO_2/M_xO_y$ solid solution OIC/OS material comprising a cubic crystal structure, wherein $M_xO_y$ is $Y_2O_3$, and wherein the zirconium, cerium, and yttrium are present at levels of up to about 95, up to about 40, and up to about 10 mole percent, respectively;
a noble metal catalyst; and
a porous support
wherein said OIC/OS material, said noble metal catalyst and said porous support are disposed on a substrate.

2. A method according to claim 1 wherein said oxide of nitrogen is contained in an exhaust stream.

3. A catalyst comprising:
a zirconium-rich $CeO_2/ZrO_2/M_xO_y$ solid solution OIC/OS material comprising a cubic crystal structure, wherein $M_xO_y$ is $Y_2O_3$, and wherein the zirconium, cerium, and yttrium are present at levels of: up to about 95, up to about 40, and up to about 10 mole percent, respectively;
a noble metal catalyst; and
a porous support,
wherein said OIC/OS material, said noble metal catalyst and said porous support are disposed on a substrate.

4. The catalyst of claim 3 wherein said cubic crystal structure is a substantially pure cubic fluorite crystal structure.

5. The catalyst of claim 3 wherein at least 95% of the OIC/OS material maintains a cubic crystal structure in air at a temperature up to about 1200° C. for at least 24 hours.

6. The catalyst of claim 5 wherein at least 99% of the OIC/OS material maintains said cubic crystal structure.

7. The catalyst of claim 3 wherein $M_xO_y$ further comprises another earth metal.

8. The catalyst of claim 7 wherein the zirconium, cerium, yttrium and another earth metal are present at levels of: up to about 90, up to about 35, from about 2 to about 10 and from 0 to about 10 mole percent, respectively.

9. The catalyst of claim 8 wherein said zirconium is about 50 to about 85 mole percent; said cerium is about 10 to about 30 mole percent; said yttrium is about 4 to about 7.5 mole percent and said earth metal is about 4 to about 7.5 mole percent.

10. The catalyst of claim 9, said OIC/OS material having a formula within the range:

$Zr_{(0.55-0.78)}Ce_{(0.16-0.40)}Y_{(0.05-0.075)}La_{(0.04-0.075)}O_{(1.875-1.975)}$.

11. The catalyst of claim 10 wherein said OIC/OS material has a substantially pure cubic fluorite crystal structure.

12. The catalyst of claim 11 wherein said OIC/OS material maintains said cubic fluorite crystal structure in air at temperatures up to about 1200° C. for at least about 24 hours.

13. A zirconium-rich $CeO_2/ZrO_2/M_xO_y$ solid solution OIC/OS material comprising a cubic crystal structure, wherein $M_xO_y$ is $Y_2O_3$, and wherein the zirconium, cerium, and yttrium are present at levels of up to about 95, up to about 40, and up to about 10 mole percent, respectively.

14. The OIC/OS material of claim 13 wherein said cubic crystal structure is a substantially pure cubic fluorite crystal structure.

15. The OIC/OS material of claim 13 wherein at least 95% of the OIC/OS material maintains a cubic crystal structure in air at temperatures up to about 1200° C. for at least 24 hours.

16. The OIC/OS material of claim 15 wherein a least 99% of the OIC/OS material maintains said cubic crystal structure.

17. The OIC/OS material of claim 13 wherein $M_xO_y$ further comprises another earth metal.

18. The OIC/OS material of claim 17 wherein said earth metal is selected from the group consisting of lanthanum, praseodymium, neodymium, promethium, gadolinium, terbium, barium, strontium, calcium and combinations comprising at least one of the foregoing.

19. The OIC/OS material of claim 17 wherein said earth metal is selected from the group consisting of rare earth metals, alkaline earth metals and combinations comprising at least one of the foregoing.

20. The OIC/OS material of claim 17 wherein the zirconium, cerium, yttrium and another earth metal are present at levels of: up to about 90, up to about 35, from about 2 to about 10 and from 0 to about 10 mole percent, respectively.

21. The OIC/OS material of claim 20 wherein said zirconium is about 50 to about 85 mole percent, said cerium is about 10 to about 30 mole percent, said yttrium is about 4 to about 7.5 mole percent and said earth metal is about 4 to about 7.5 mole percent.

22. The OIC/OS material of claim 21 having a formula within the range:

$Zr_{(0.55-0.78)}Ce_{(0.16-0.40)}Y_{(0.05-0.75)}La_{(0.04-0.075)}O_{(1.875-1.975)}$.

23. The OIC/OS material of claim 22 wherein said cubic crystal structure is a substantially pure cubic fluorite crystal structure.

* * * * *